(12) United States Patent
Nebesnak et al.

(10) Patent No.: US 7,413,392 B2
(45) Date of Patent: Aug. 19, 2008

(54) PLASTIC/METAL COMPOSITE STRESS PLATE AND METHOD OF USING SAME FOR SECURING A THERMOPLASTIC ROOF MEMBRANE TO ROOF DECK

(75) Inventors: Edward Nebesnak, Mine Hill, NJ (US); William P. Kuhn, Stonington, CT (US)

(73) Assignee: Building Materials Investment Corporation, Wayne, NJ (US)

( * ) Notice: Subject to any disclaimer, the term of this patent is extended or adjusted under 35 U.S.C. 154(b) by 0 days.

(21) Appl. No.: 11/116,701

(22) Filed: Apr. 28, 2005

(65) Prior Publication Data

US 2005/0196253 A1 Sep. 8, 2005

Related U.S. Application Data

(63) Continuation-in-part of application No. 10/378,103, filed on Feb. 27, 2003, now abandoned.

(51) Int. Cl.
*F16B 43/00* (2006.01)
*E04D 5/14* (2006.01)

(52) U.S. Cl. .................. 411/531; 411/82.2; 52/410

(58) Field of Classification Search ............... 411/531, 411/533, 480, 396, 902, 903, 82.2; 52/410
See application file for complete search history.

(56) References Cited

U.S. PATENT DOCUMENTS

| | | | | |
|---|---|---|---|---|
| 3,671,371 A | | 6/1972 | Wolf ........................ 161/43 |
| 4,264,995 A | * | 5/1981 | Hinden ..................... 470/28 |
| 4,737,213 A | | 4/1988 | Paeglis et al. ............ 156/157 |
| 4,747,241 A | * | 5/1988 | Whitman .................. 52/410 |
| 4,787,188 A | | 11/1988 | Murphy .................... 52/410 |
| 4,852,323 A | * | 8/1989 | Kartfilt ..................... 52/410 |
| 4,907,927 A | * | 3/1990 | Choiniere ................ 411/368 |
| 5,018,329 A | * | 5/1991 | Hasan et al. .............. 52/410 |
| 5,049,018 A | | 9/1991 | Murphy .................... 411/488 |
| 5,110,398 A | | 5/1992 | Murphy .................... 156/499 |
| 5,163,798 A | | 11/1992 | McGovern ............... 411/448 |
| 5,562,380 A | * | 10/1996 | Hempfling et al. ........ 411/542 |
| 5,935,357 A | | 8/1999 | Hubbard et al. ........... 156/82 |
| 6,640,511 B1 | | 11/2003 | Link .......................... 52/410 |
| 6,764,260 B1 | * | 7/2004 | Nebesnak et al. ......... 411/82 |

\* cited by examiner

*Primary Examiner*—Flemming Saether
(74) *Attorney, Agent, or Firm*—William J. Davis; Sills Cummis & Gross P.C.

(57) ABSTRACT

A two-piece fastener assembly for securing thermoplastic roof membranes to an underlying roof deck having: a stress plate and a fastener. The stress plate consists of a pre-fabricated metal layer and a thermoplastic layer which are integral with each other. The stress plate has top having three flat surfaces and two circumferential portions, forming ridges or protuberances connecting the flat surfaces. In a method aspect the steps of securing thermoplastic roof membranes to an underlying roof deck, includes: placing a first thermoplastic roof membrane on the roof deck; placing a line of stress plates on the marginal portion of the first thermoplastic roof membrane and securing the stress plates along with the first thermoplastic roof membrane to the roof deck by use of the fastener; placing a second thermoplastic roof membrane to overlap the line of stress plates and the marginal portion of the first thermoplastic roof membrane; and applying heat and pressure to the line of stress plates and the overlapped portion of the first and second thermoplastic roof membranes to fuse them together and provide a waterproof covering over the roof deck.

8 Claims, 8 Drawing Sheets

PLASTIC/METAL COMPOSITE STRESS PLATE AND METHOD OF USING SAME FOR SECURING A THERMOPLASTIC ROOF MEMBRANE TO ROOF DECK

CROSS REFERENCE TO RELATED APPLICATION

The present application is a continuation-in-part of application Ser. No. 10/378,103, filed Feb. 27, 2003 now abandoned.

BACKGROUND OF THE INVENTION

1. Field of the Invention

The present invention relates to fasteners employed to fasten a covering material to an underlying substrate. More particularly, the invention relates to a plastic/metal composite stress plate with a fastener for fastening a membrane, such as a roof membrane or roofing insulation, to a roof deck, a wall, concrete, stone, plaster, or wood.

2. Reported Development

Fasteners are conventionally employed in the building industry for fastening or clamping a flexible membrane, such as an insulation membrane to a substrate, such as a roof deck. The fasteners typically comprise a large head portion and a shank portion. In use, the shank portion is driven through the membrane into the underlying substrate to anchor the fastener thereinto, while the head portion holds the membrane against the substrate and prevent removal thereof by wind lift. The undersurface of the head portion is typically provided with gripping means so that the membrane is prevented from moving or sliding under the fastener. The gripping means are designed not to penetrate the membrane in order to prevent atmospheric moisture from entering into the substrate through the holes which tend to be made by the gripping means. It is also important that the gripping means are spread/distributed in the undersurface of the head portion of the stress plate in order prevent tearing of the membrane. Conventional fasteners are illustrated by the following references.

U.S. Pat. No. 4,787,188 discloses a stress plate for securing a roof membrane to a roof deck. The stress plate is circular having a top surface and a bottom surface with a central circular opening for receiving a screw for fastening the stress plate over a roof membrane and to the roof deck. The stress plate is equipped with four gripping prongs of triangular shape which are circumferentially spaced from each other by 90°.

In use a first membrane is applied to a roof deck surface, then the membrane is secured to the roof deck surface with the stress plate and the screw. A top sheet or membrane is lapped over the first membrane to cover the stress plate and welded to the first membrane. The four gripping prongs in the stress plate grip the first sheet and hold the same on top of the roof deck without tearing.

U.S. Pat. No. 5,049,018 discloses a fastener for gripping a substrate material. The fastener is of a unitary piece comprising a head portion, a shaft portion, and a hook portion at the end of the shaft portion, wherein the hook portion has an outwardly and upwardly extending resilient end portion. The end portion has an end surface which provides gripping contact with a wall of a hole in a substrate into which the fastener is inserted.

U.S. Pat. No. 5,163,798 relates to a fastener assembly which is employed to secure plies or membranes of roofing, felt and paper to prevent the materials from being blown off the base roofing material before the base material is sufficiently hardened.

The assembly comprises a fastener and a retainer plate. The assembly includes a fastener plate which defines a substantially rectangular opening. The fastener includes a head and a pair of legs which are integrally hingably connected to the head. The legs have a contoured distal portion and an angular side configuration so that at least one of the legs is forced apart as the fastener is driven into the base material.

We have observed that under windy conditions the prior art fasteners need improvement in securely holding a flexible membrane on a substrate without the gripping means penetrating the flexible membrane, and without tearing the flexible membrane.

Accordingly, an object of the present invention is to provide a new and improved stress plate with a fastener to allow attachment of one or more flexible membranes to an underlying substrate without tearing the flexible membrane or allowing it to slip out from under the stress plate.

In another aspect, the present invention relates to a method for securing thermoplastic roof membranes to a roof deck using a stress plate and fastener and fusing overlapping portions of two roof membranes to provide a waterproof covering over a roof deck.

Asphalt roof membranes to prevent moisture from entering into an underlying roof deck are being replaced by thermoplastic sheet materials which offer a superior, longer-lasting roof at a lower cost. In the process of installing thermoplastic sheet materials over a roof deck, the typical steps are as follows. A first sheet is laid adjacent to the lower edge of the roof and running parallel thereto. Fastening means, such as batten bar or a line of stress plates are positioned neat the upper edge of the first sheet. Fasteners are inserted through the batten bar or stress plates and into the roof deck to securely hold the first sheet to the roof deck. Then a second sheet is laid over the roof deck in a marginally overlapping relationship with the first sheet. The second sheet also overlaps the batten bar or the line of stress plates. The overlapping edge area of the second sheet overlaps the area of the first sheet on both sides of the batten bar or line of stress plates. A weld is then applied between the first sheet and the second sheet resulting in the fusion of the two sheet on both sides of the batten bar or the line of stress plates. The weld is applied by the use of a welding machine or tool which softens the thermoplastic sheets and, after cooling, solidifies and forms a continuous sheet. The steps are repeated until the roof deck is completely covered by the thermoplastic sheets.

It has been observed that stress plates having a high profile create bumps in the weld area. It has also been observed that stress plates made of metals do not adhere to the second or overlapping thermoplastic sheet thereby creating bubbles in the weld. Accordingly, it is another object of the present invention to provide a low profile stress plate which substantially remains in the plane of the thermoplastic sheets and which is coated with a thermoplastic material so that the second or overlapping sheet is also welded to the stress plate.

U.S. Pat. No. 6,640,511 discloses an anchor plate with a fastener. The plate has an elevated bonding platform and a countersink. The bonding platform is coated with a heat activable adhesive. The other top surfaces are not coated with the adhesive.

The reference uses an electromagnetic induction heater for attaching a thermoplastic membrane to the anchor plate and the underlying roof structure.

Attaching thermoplastic membranes to a roof surface by using electromagnetic induction heat is cumbersome.

These and other aspects will be addressed as the description of the invention proceeds.

SUMMARY OF THE INVENTION

In the device aspect, the present invention comprises two non-integral components: a metal stress plate and a fastener. The stress plate has a top surface and a bottom surface and includes an opening in its center portion to allow a fastener, such as a screw, therethrough for attachment of the stress plate to an underlying substrate, such as a roof deck. The opening may be circular or rectangular. The top surface of the stress plate is coated with a thermoplastic coat, such as polyvinyl chloride, thermoplastic olefins, chlorinated polyethylene, chlorosulfonated polyethylene, nylon and ethylene propylene diene rubber. The stress plate has a low height profile so that on installation a thermoplastic sheet will not produce bumps therein. To achieve this objective, the total height of the stress plate will be of from about 0.026" to about 0.100" and preferably about 0.050" to 0.070". It is to be noted that the metal and thermoplastic components are integral with each other in the stress plate, and that the circumferential portions form ridges or protuberances designed to provide strength and adhesive properties to the thermoplastic sheets when laid over the stress plate.

In the method aspect, the present invention comprises the steps of:
 a) laying a first thermoplastic sheet or membrane on a portion of the roof deck;
 b) laying a line of stress plates near the edge of the thermoplastic sheet or membrane parallel to the edge;
 c) securing the thermoplastic sheet or membrane on the roof deck by inserting fasteners through the stress plates, the first thermoplastic sheet or membrane and into the roof deck;
 d) laying a second thermoplastic sheet or membrane on the roof deck in an overlapping relationship to the line of stress plates and the first thermoplastic sheet or membrane; and
 e) applying heat and pressure to the overlapped portion of the thermoplastic sheets or membranes on both sides of the line of stress plates and over the line of stress plates thereby causing a fusion of the thermoplastic sheets or membranes and to the line of the stress plates.

The heat weld may be accomplished by a welding machine known in the art, such as described in U.S. Pat. Nos. 4,259, 142, 4,289,552, 4,440,588, 4,533,423, 4,861,412, 4,894,112, 5,110,398, and 5,935,357. However, we prefer to use a welding machine which is disclosed in U.S. Pat. No. 6,536,498, and is incorporated by reference in its entirety. The welding machine comprises a pressure roller and a heating element for a welding apparatus for producing a weld simultaneously on each side of a line of fasteners and over the fasteners. The pressure roller is integral with an axle designed to be connected to a driving means at one end thereof, at the other end of the axle the pressure roller comprises a distal end, a proximal end and a center portion which defines a groove between the proximal and distal ends. The groove of the pressure roller carries an elastomeric cushion designed to smoothly ride over a line of fastening means.

The pressure roller is used in combination with a heating element containing a blower which forces heated air through a nozzle. The nozzle having an outlet therein comprises three portions: two large opening portions and a restricted opening portion therebetween. In use, the large opening portions allow delivery of the major portion of the hot air produced by the heating element while the restricted opening still allows delivery of sufficient amounts of the heated air to soften the overlapping portions of the thermoplastic sheet over and under the fastening means.

The stress plate of the present invention may be of circular, ellipsoidal, square, or rectangular configuration.

DESCRIPTION OF THE PREFERRED EMBODIMENTS

Figure 1:
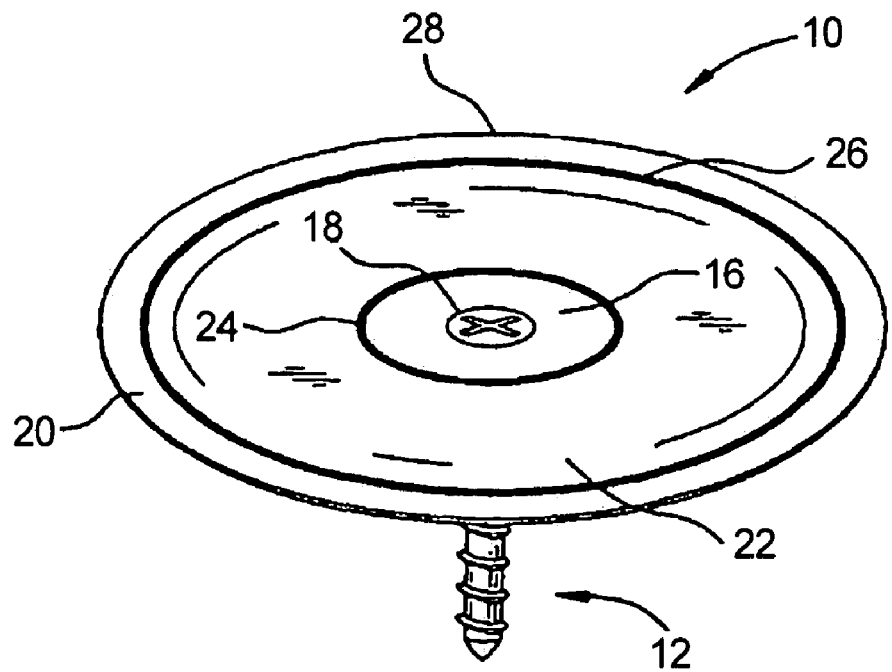
FIG. 1 is a top, perspective view of the circular plastic/metal composite stress plate with a fastener.
Figure 2:
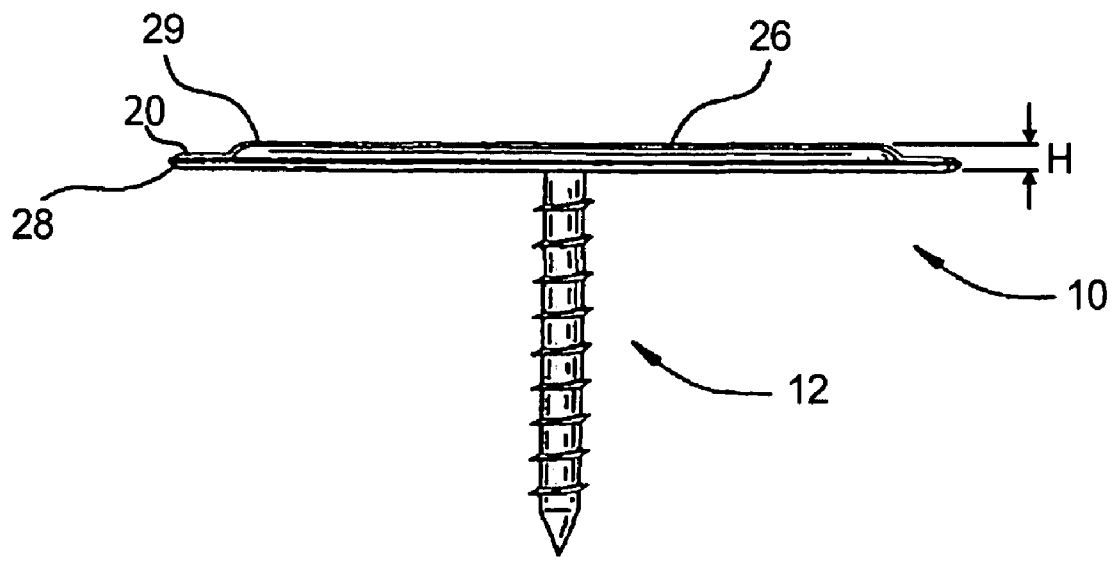
FIG. 2 is a side elevational view thereof, all other sides being identical thereto.
Figure 3:
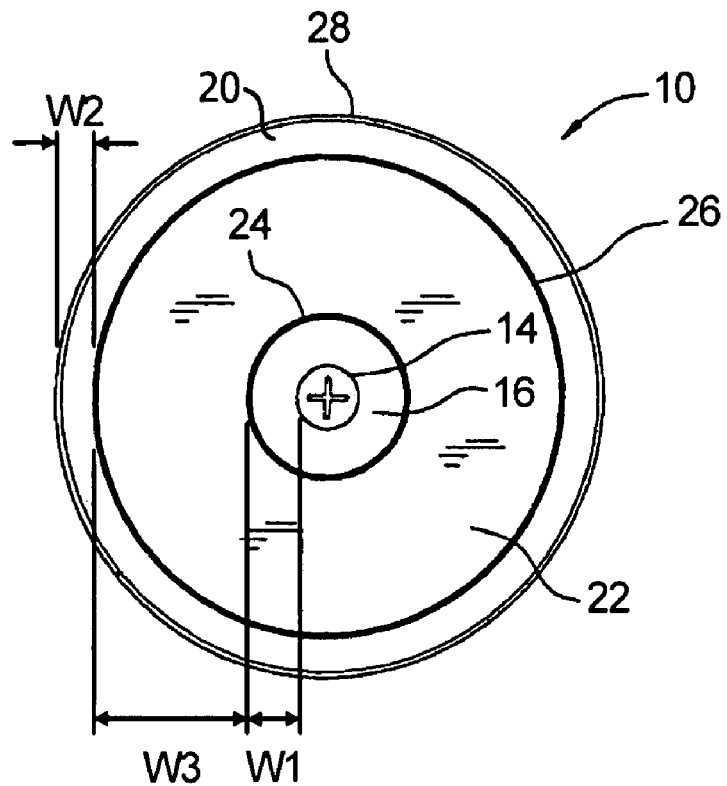
FIG. 3 is a top plan view thereof.
Figure 4:
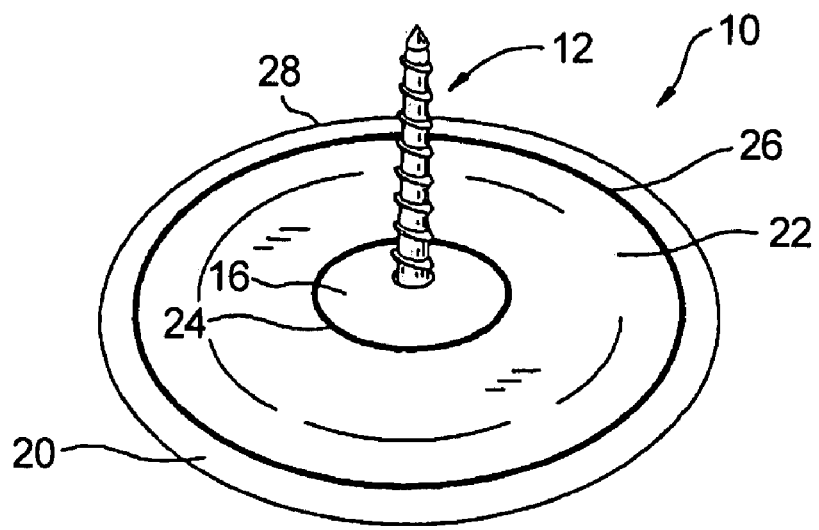
FIG. 4 is a bottom perspective view thereof.
Figure 5:
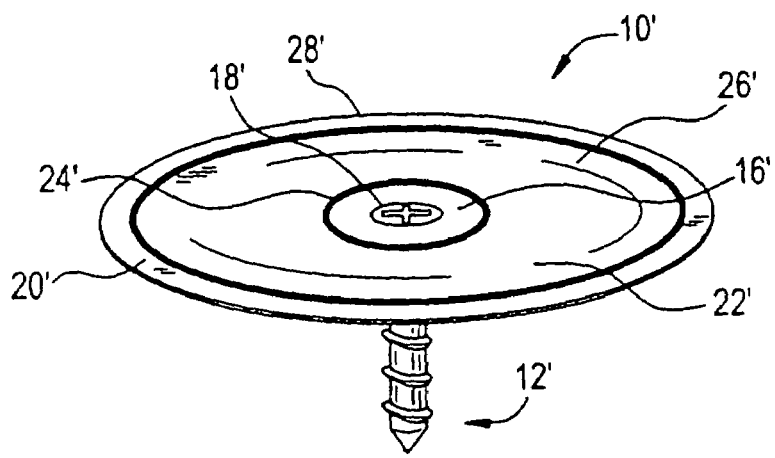
FIG. 5 is a top perspective view of the ellipsoidal plastic/metal composite stress plate with a fastener.
Figure 6:
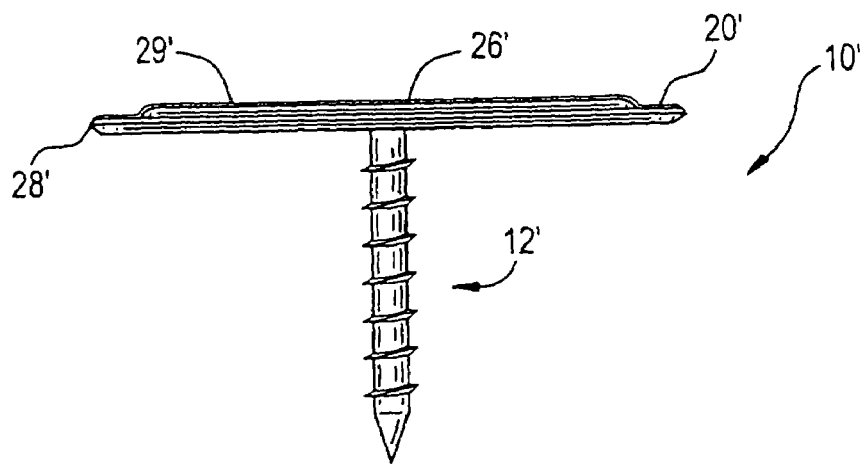
FIG. 6 is a side elevational view thereof.
Figure 7:
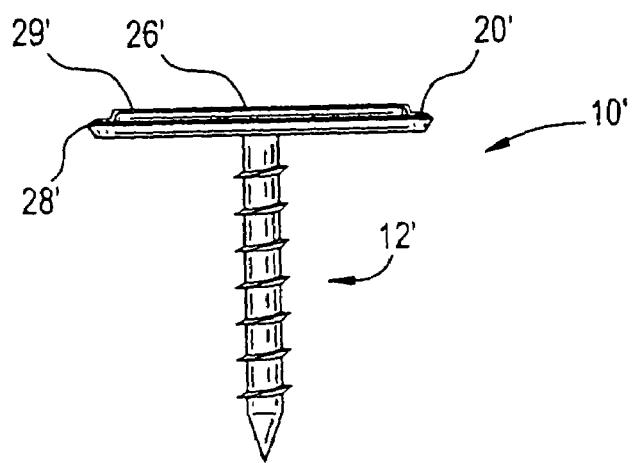
FIG. 7 is another side elevational view thereof.
Figure 8:
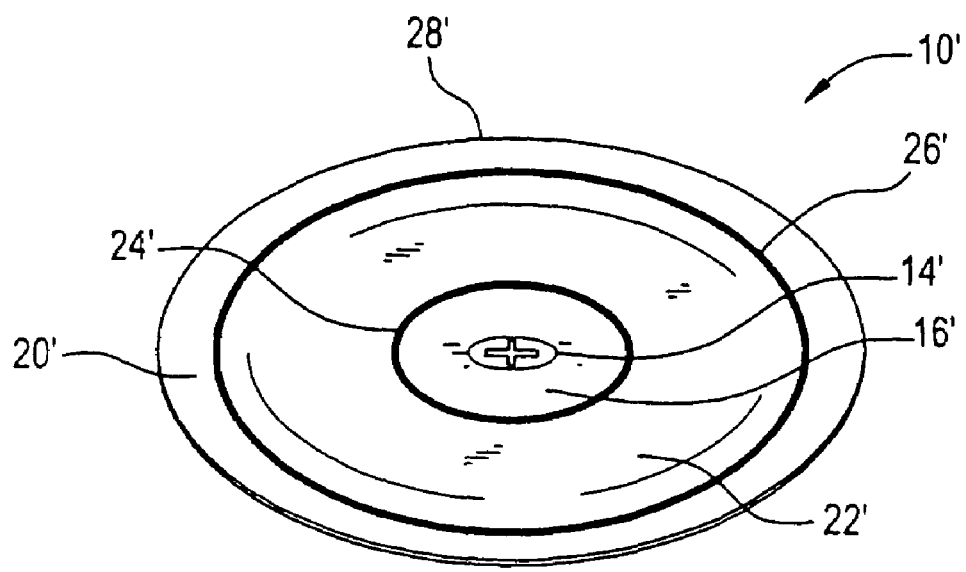
FIG. 8 is a top plan view thereof.
Figure 9:
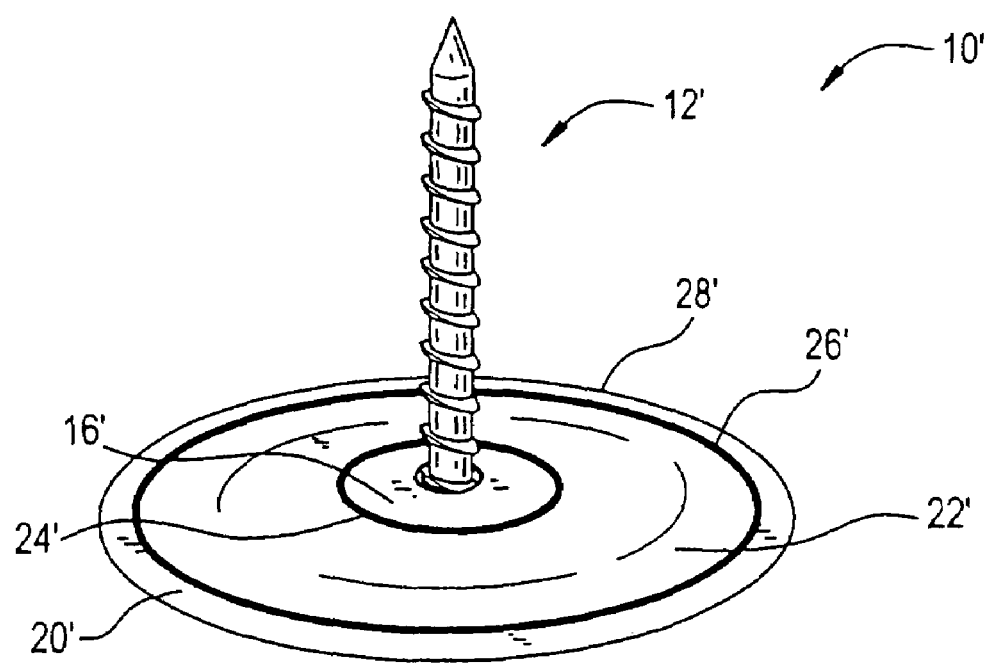
FIG. 9 is a bottom perspective view thereof.
Figure 10:
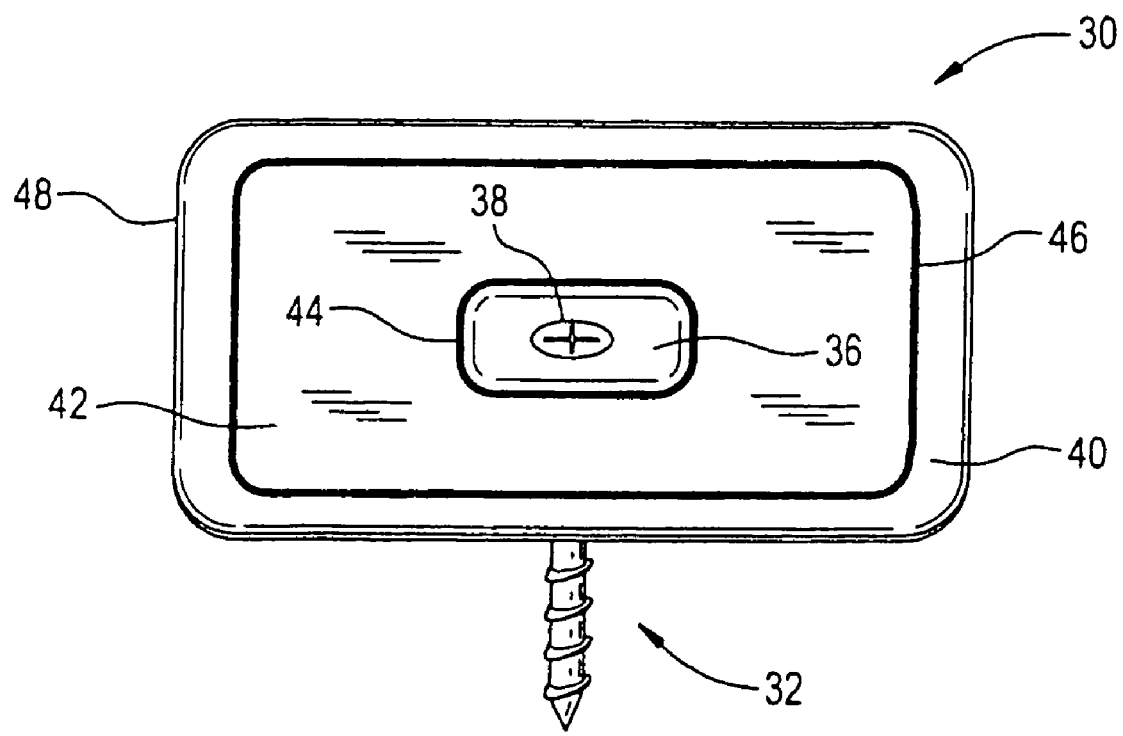
FIG. 10 is a top perspective view of the square plastic/metal composite stress plate with a fastener.
Figure 11:
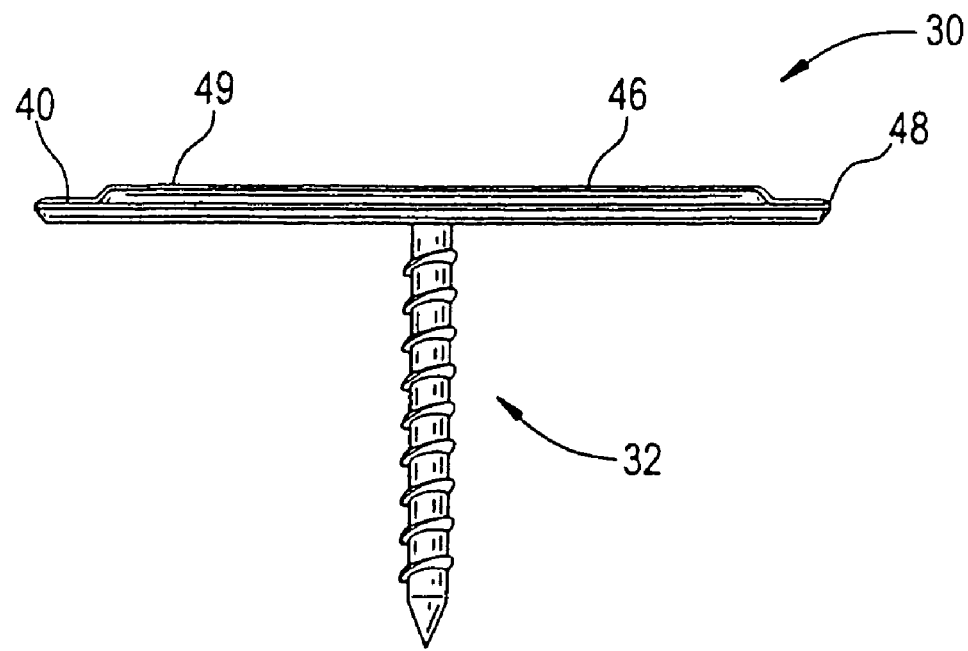
FIG. 11 is a side elevational view thereof, all other sides being identical thereto.
Figure 12:
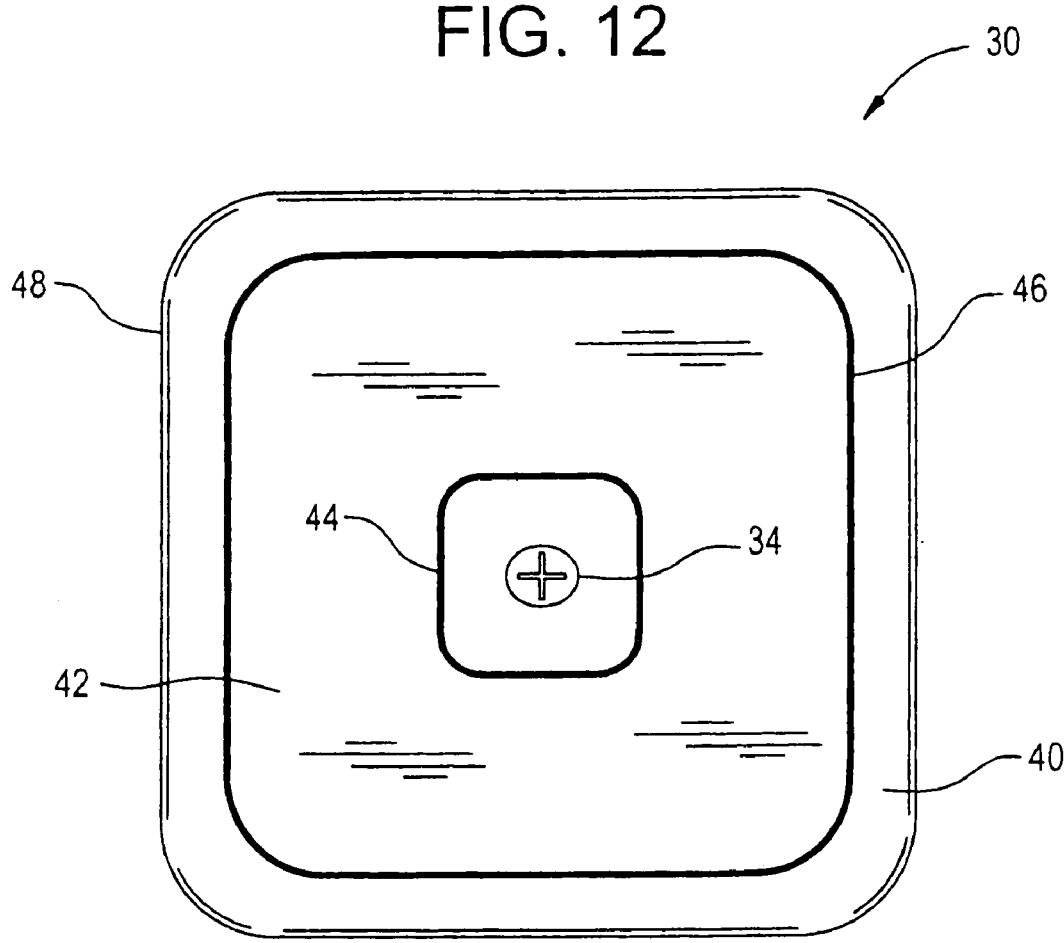
FIG. 12 is a top plan view thereof.
Figure 13:
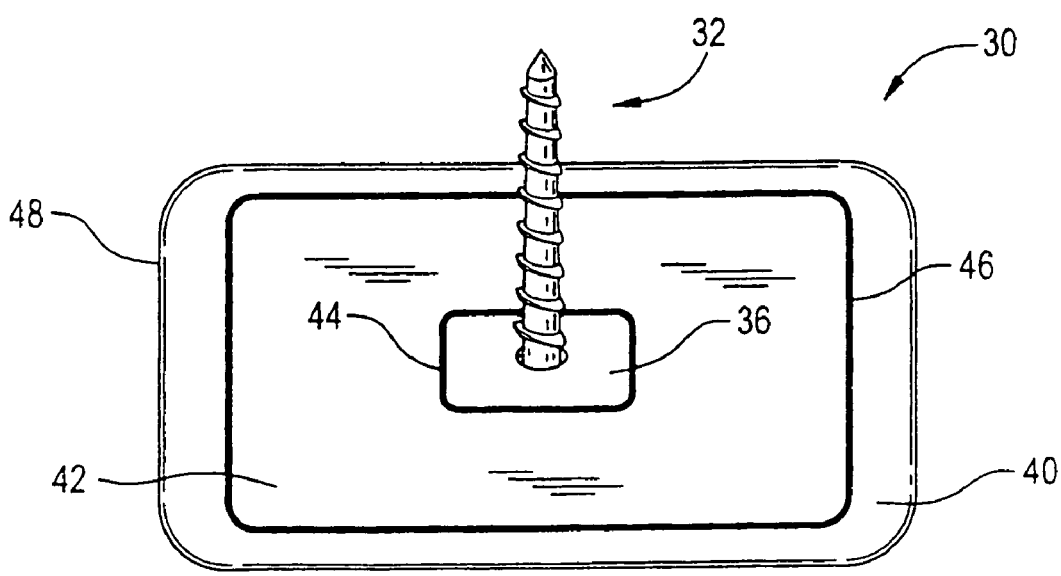
FIG. 13 is a bottom perspective view thereof.
Figure 14:
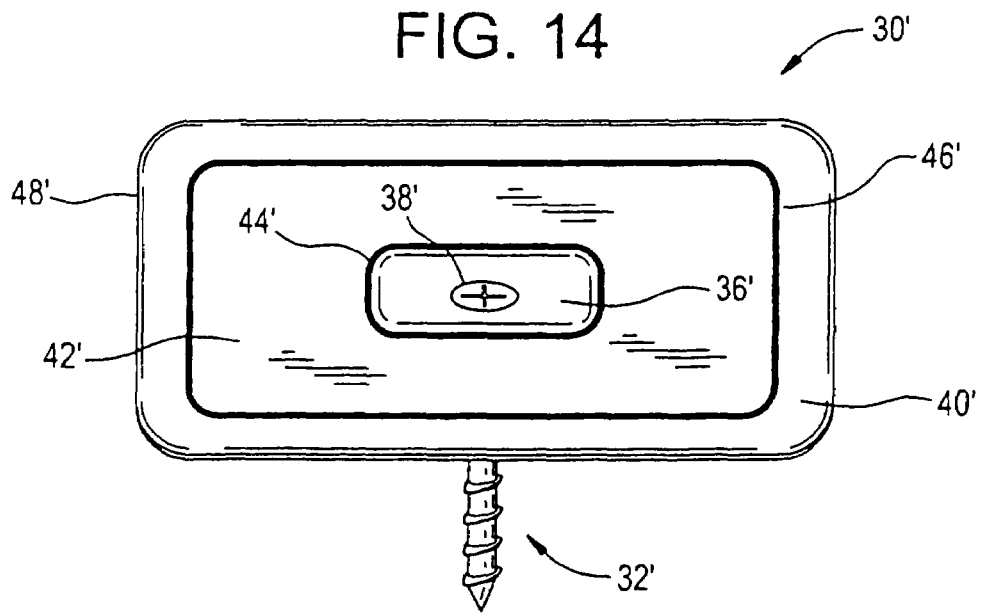
FIG. 14 is a top perspective view of the rectangular plastic/metal composite stress plate with a fastener.
Figure 15:
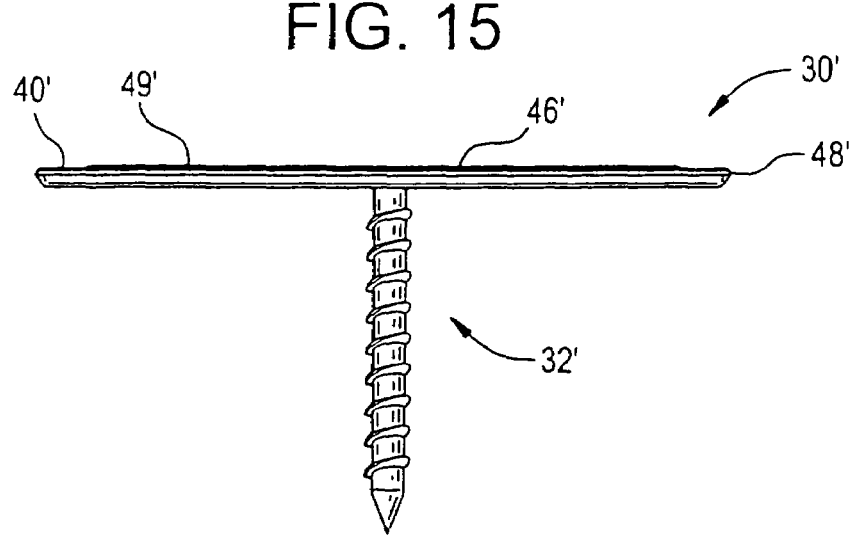
FIG. 15 is a side elevational view thereof.
Figure 16:
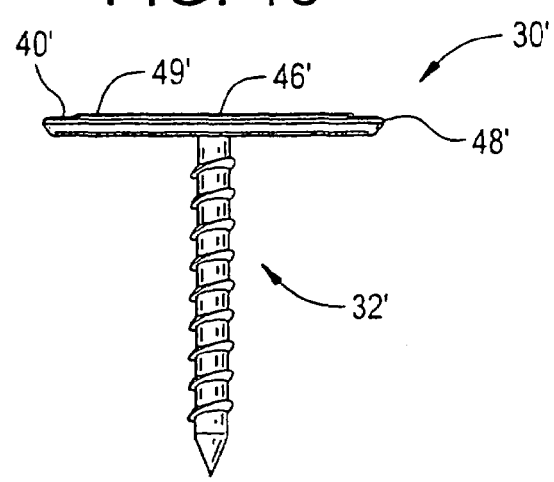
FIG. 16 is another side elevational view thereof.
Figure 17:
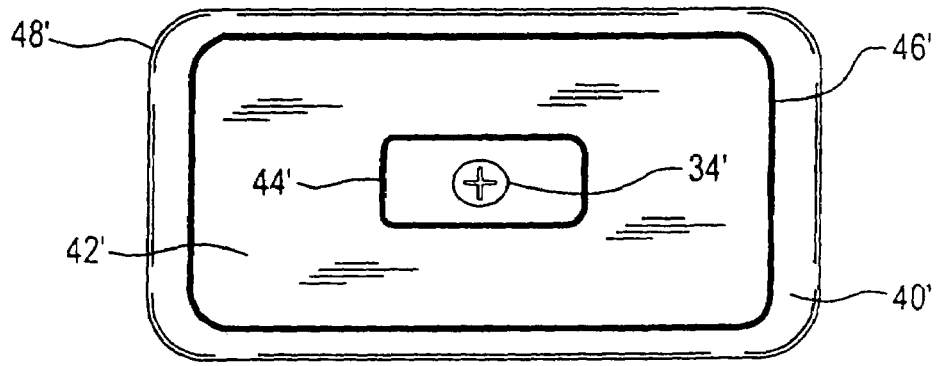
FIG. 17 is a top plan view thereof.
Figure 18:
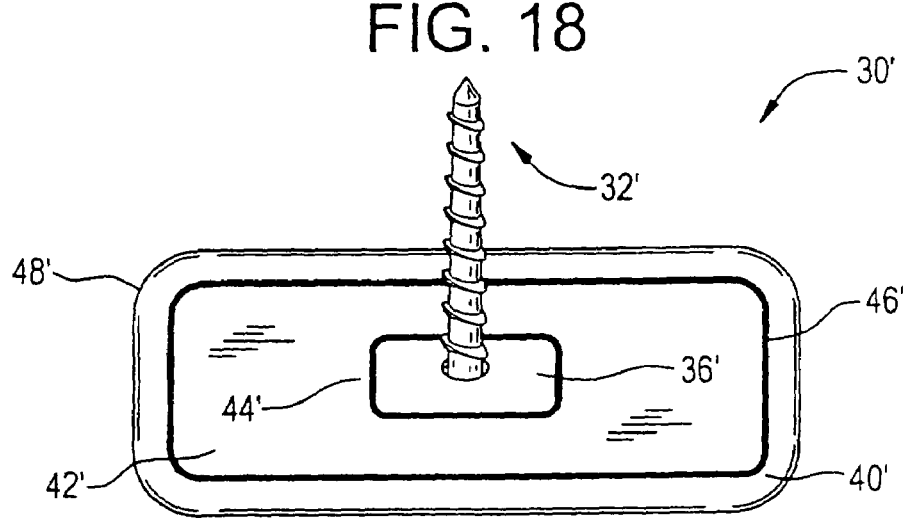
FIG. 18 is a bottom perspective view thereof.

Reference is now being made to the drawings wherein like numerals represent like parts throughout the figures showing the various embodiments of the present invention.

First Embodiment

Circular Stress Plate with Fastener

FIGS. 1-4 relate to the first embodiment of the present invention in which the circular stress plate is generally designated at 10 and the fastener is generally designated at 12. The components are non-integral and, when put together, constitute the invention. The circular stress plate 10 has a round or rectangular opening 14 in its center portion through which the fastener is inserted when the stress plate is employed for attaching and firmly holding a roof membrane to an underlying roof deck. The stress plate has a circular body with a top surface and a bottom surface and characterized by
 a) a diameter of from about 1" to about 4" or more, and preferably about 2";
 b) an opening 14 in its center portion the diameter of which is about 0.25";
 c) a first flat surface 16 surrounds the opening having a width W1 of about 0.25" which is designed to receive the head portion 18 of fastener 12 without passing through said opening 14;

d) a second flat surface 20 adjacent to the circumferential edge 28 having a width W2 of from about 0.12" to about 0.25", and preferably about 0.20";

e) a third flat surface 22 extends between the first flat surface 16 and the second flat surface 20 having a width W3 of from about 0.25" to about 1.0", and preferably about 0.50";

f) connecting the second flat surface 20 with third flat surface 22, a first circumferential portion 24 in the form of a ridge or protuberance extends above the second flat surface and towards third flat surface at an angle of from about 25° to about 70°, and preferably at about 45°; and g) connecting the first flat surface 16 and the third flat surface 22 a second circumferential portion 26 in the form of a ridge or protuberance extends above the first flat surface and towards the third flat surface at an angle of from about 25° to about 70°, and preferably at about 45°.

The distance between the first flat surface 16 and the third flat surface 22 is of from about 0.026" to about 0.100", and preferably about 0.050" to 0.070". The distance between the second flat surface 20 and the third flat surface 22 is also of from about 0.026" to about 0.100", and preferably about 0.050" to about 0.070".

The composition of the stress plate consists of a metal, such as steel or galvanized metals, having a thickness of about 1 to 3 mm; and a thermoplastic layer 29 coated on and being integral with the top surface of the metal plate having a thickness of about 0.5 mm to 2 mm. The thermoplastic coat completely covers the top surface of the stress plate, namely the first, second, and third flat surfaces and the first and second circumferential portions which connect the first, second and third flat surfaces. The total height H of the stress plate is preferably about 0.050" to 0.070".

Second Embodiment

Ellipsoidal Stress Plate with Fastener

FIGS. 5-9 relate to the second embodiment of the present invention in which the ellipsoidal stress plate is generally designated at 10' and the fastener is generally designated at 12' The two components are non-integral and, when put together, constitute the invention. The ellipsoidal stress plate 10' has a round or rectangular opening 14' in its center portion through which the fastener is inserted when the stress plate is employed for attaching and firmly holding a roof membrane to an underlying roof deck. The stress plate has an ellipsoidal body with a top surface and a bottom surface and is characterized by:

a) a larger diameter of from about 1" to about 4" or more, and preferably about 2";

b) a smaller diameter of from about 0.5" to about 2", and preferably about 1.5";

c) an opening 14' in its center portion the diameter of which is about 0.25";

d) a first flat surface 16' surrounds the opening having a larger radius of about 0.25" and a smaller radius of about 0.15" which is designed to receive the head portion 18' of the fastener 12' without passing through said opening 14';

e) a second flat surface 20' adjacent to the circumferential edge 28' having a larger radius of from about 0.12" to about 0.25", and preferably about 0.20", and a smaller radius of about 0.15" to 20";

f) a third flat surface 22' extends between the first flat surface 16' and second flat surface 20' having a larger radius of from about 0.25" to about 0.75", and preferably about 0.50" and a smaller radium of about 0.15";

g) connecting the second flat surface 20' with the third flat surface 22', a first circumferential portion 24' in the form of a ridge or protuberance extends above the second flat surface and towards the third flat surface at an angle of from about 25° to about 70°, and preferably at about 45°; and h) connecting the first flat surface 16' and the third flat surface 22', a second circumferential portion 26' in the form of a ridge or protuberance extends above the first flat surface and towards the third flat surface at an angle of from about 25° to about 70°, and preferably at about 45°.

The distance between the first flat surface 16' and the third flat surface 22' is of from about 0.026" to about 0.100", and preferably about 0.050" to 0.070". The distance between the second flat surface 20' and the third flat surface 22' is also of from about 0.026" to about 0.100", and preferably about 0.050" to about 0.070".

The composition of the stress plate consists of a metal, such as steel or galvanized metals, having a thickness of about 1 to 3 mm; and a thermoplastic layer 29' coated on the top surface of the metal plate having a thickness of about 0.5 mm to 2.0 mm. The thermoplastic coat completely covers the top surface of the stress plate, namely the first, second, and third flat surfaces and the first and second circumferential portions which connect the first, second and third flat surfaces. The total height of the stress plate is preferably about 0.050 to 0.070".

Third Embodiment

Square Stress Plate with Fastener

FIGS. 10-13 relate to the third embodiment of the present invention in which the square stress plate is generally designated at 30 and the fastener is generally designated at 32. The components are non-integral and, when put together, constitute the invention. The square stress plate 30 has a round or rectangular opening 34 in its center portion through which the fastener is inserted when the stress plate is employed for attaching and firmly holding a roof membrane to an underlying roof deck. The stress plate has a square body with a top surface and a bottom surface and is characterized by:

a) a larger diameter of from about 1" to about 4" or more, and preferably about 2";

b) an opening 34 in its center portion the diameter of which is about 0.25";

c) a first flat surface 36 surrounds the opening having a radius of about 0.25" which is designed to receive the head portion 38 of the fastener 32 without passing through said opening 34;

d) a second flat surface 40 adjacent to the parametrical edge 48 having a radius of from about 0.12" to about 0.25", and preferably about 0.20";

e) a third flat surface 42 extends between the first flat surface 36 and second flat surface 40 having a radius of from about 0.25" to about 0.75", and preferably about 0.50";

f) connecting the second flat surface 40 with the third flat surface 42, a first circumferential portion 44 in the form of a ridge or protuberance extends above the first flat surface and towards the third flat surface at an angle of from about 25° to about 70°, and preferably at about 45°; and g) connecting the second flat surface 40 and the third flat surface 42', a second parametrical portion 46 in the form of a ridge or protuberance extends above the second flat surface and towards the third flat surface at an angle of from about 25° to about 70°, and preferably at about 45°.

The distance between the first flat surface 36 and the third flat surface 42 is of from about 0.026" to about 0.100", and preferably about 0.050" to 0.070". The distance between the second flat surface 40 and the third flat surface 42 is also of from about 0.026" to about 0.100", and preferably about 0.050" to about 0.070".

The composition of the stress plate consists of a metal, such as steel or galvanized metals, having a thickness of about 1 to 3 mm; and a thermoplastic layer 49 coated on the top surface of the metal plate having a thickness of about 0.5 mm to 2.0 mm. The thermoplastic coat completely covers the top surface of the stress plate, namely the first, second, and third flat surfaces and the first and second parametrical portions which connect the first, second and third flat surfaces. The total height of the stress plate is preferably about 0.050" to 0.070".

Fourth Embodiment

Rectangular Stress Plate with Fastener

FIGS. 14-18 relate to the fourth embodiment of the present invention in which the rectangular stress plate is generally designated at 30' and the fastener is generally designated at 32'. The components are non-integral and, when put together, constitute the invention. The stress plate 30' has a round or rectangular opening 34' in its center portion through which the fastener is inserted when the stress plate is employed for attaching and firmly holding a roof membrane to an underlying roof deck. The stress plate has a rectangular body with a top surface and a bottom surface and is characterized by:

a) a larger diameter of from about 1" to about 4" or more, and preferably about 2";
b) a smaller diameter of from about 0.5" to about 2", and preferably about 1.5";
c) an opening 34' in its center portion the diameter of which is about 0.25";
d) a first flat surface 36' surrounds the opening having a larger radius of about 0.25" and a smaller radius of about 0.15" which is designed to receive the head portion 38' of the fastener 32' without passing through said opening 34';
e) a second flat surface 40' adjacent to the parametrical edge 48' having a larger radius of from about 0.12" to about 0.25", and preferably about 0.20", and a smaller radius of about 0.15" to 20";
f) a third flat surface 42' extends between the first flat surface 36' and second flat surface 40' having a larger radius of from about 0.25" to about 0.75", and preferably about 0.50" and a smaller radius of about 0.15" to 20"
g) connecting the second flat surface 40' with the third flat surface 42', a first parametrical portion 44' in the form of a ridge or protuberance extends above the first flat surface and towards the third flat surface at an angle of from about 25° to about 70°, and preferably at about 45°; and
h) connecting the second flat surface 40' with the third flat surface 42', a second parametrical portion 46' in the form of a ridge or protuberance extends above the second flat surface and towards the third flat surface at an angle of from about 25° to about 70°, and preferably at about 45°.

The distance between the first flat surface 36' and the third flat surface 42' is of from about 0.026" to about 0.100", and preferably about 0.050" to 0.070". The distance between the second flat surface 40' and the third flat surface 42' is also of from about 0.026" to about 0.100", and preferably about 0.050" to about 0.070".

The composition of the stress plate consists of a metal, such as steel or galvanized metals, having a thickness of about 1 to 3 mm; and a thermoplastic layer 49' coated on the top surface of the metal plate having a thickness of about 0.5 mm to 2.0 mm.

Softer metals such as copper and aluminum may also be used, however, the thickness of the stress plate should be larger to provide sufficient integrity to the stress plate. The fastener is typically a screw of 2 to 3 inches long having threads thereon.

The thermoplastic coat completely covers the top surface of the stress plate, namely the first, second and third flat surfaces and the first and second parametrical portions which connect the first, second and third flat surfaces. The total height of the stress plate is preferably about 0.050" to 0.070".

In all of the embodiments of the present invention the ridge or protuberance connecting the flat surface serves the dual purpose of providing strength and rigidity to the stress plate, and firmly grips the second thermoplastic membrane in the marginal overlapping of the first thermoplastic membrane.

The low profile of the four embodiments of the present invention insures that when a second membrane covers the line of stress plates, no objectionable bumps are created, to wit, the stress plates substantially remain in the plane of the membranes.

Figure 19:
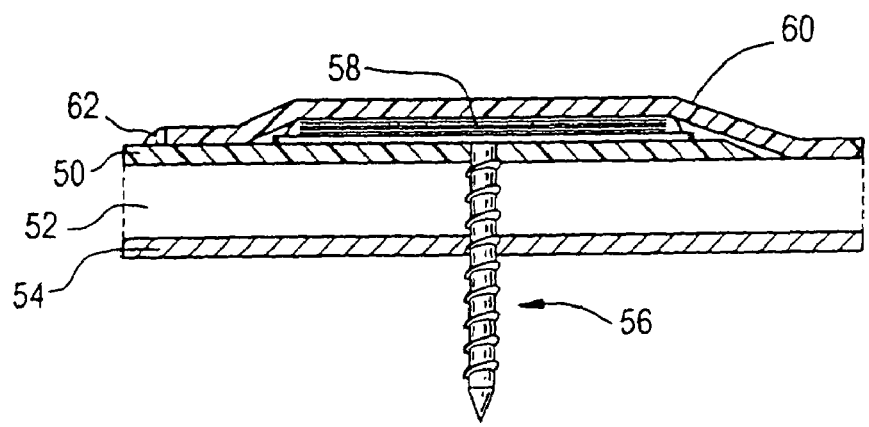
FIG. 19 is a is a cross-sectional view illustrating the use of the stress plate and the fastener for attaching roof membranes to a roof deck.

FIG. 19 is a cross-sectional view illustrating the use of the stress plate and the fastener for attaching a roof membrane to a roof deck. Lower thermoplastic membrane 50 is positioned over insulation 52 which is over the roof deck surface 54. The fastener 56 is then inserted through stress plate 58, insulation 52, and into roof deck 54. Upper thermoplastic membrane 60 is then lopped over the marginal portions of the lower membrane covering the stress plate 58. Upper membrane 60 is secured to the stress plate and the lower membrane by welded seam 62.

Wind Uplift Test

Comparative wind uplift tests were conducted on a 2" diameter circular composite stress plate versus a standard 2" diameter circular metal plate without thermoplastic coating thereon. The wind uplift test measures the resistance of the roofing system to high wind currents. For example, a three second burst of wind at 175 miles per hour can exert a negative pressure of 90 pounds per square foot on the roof system.

The composite circular stress plate consisted of a stainless steel plate coated with polyvinyl chloride; while the standard metal stress plate had no coating thereon.

A) Composite Stress Plate

The roofing system consisted of: a roof deck, an insulating layer placed on the roof deck, and a thermoplastic roof membrane placed on the top of the insulating layer. A line of composite stress plates was placed on the marginal area of the thermoplastic layer spaced 6" apart from each other. The composite stress plates were then attached to the roof system by inserting the fasteners through the stress plates, the roofing membrane, and insulating layer and into the roof deck. A second roofing membrane was then placed on the first roofing membrane in a marginally overlapping position to the first roofing membrane and the line of stress plates. The overlapping portions of the first and second membranes were about 3" wide. The welding was accomplished by subjecting the overlapped portions to heat, softening them to a weldable consistency and pressing them together by an apparatus having a heat and pressure means. After the overlapped portions of the membranes cooled, a solid seal was formed and the welded are was subjected to wind uplift test. The wind uplift test at 60 seconds showed 180 pounds of pressure per square foot.

The testing was repeated using the same materials, conditions and processes except that the composite stress plates were spaced every 12" apart from each other. The wind uplift test at 60 seconds showed 105 pounds of pressure per square foot.

B) Standard Metal Stress Plate

Wind uplift tests were conducted using the same materials, conditions and processes described in (A) above, except instead of the composite stress plate of the present invention a standard stainless steel stress plate was used. The stainless steel stress plates spaced every 6" from each other showed a wind uplift at 60 seconds 150 pounds of plates pressure per square foot, and when the stainless steel stress plates were spaced 12" from each other, the wind uplift test at 60 seconds was found to be 75 pounds of pressure per square foot.

PARTS LIST

First and Second Embodiments

| | |
|---|---|
| Circular and ellipsoidal stress plates, generally designated | 10, 10' |
| Fastener, generally designated | 12, 12' |
| Opening in center portion of stress plate | 14, 14' |
| First flat surface | 16, 16' |
| Head portion of fastener | 18, 18' |
| Second flat surface | 20, 20' |
| Third flat surface | 22, 22', |
| First circumferential portion | 24, 24' |
| Second circumferential portion | 26, 26' |
| Circumferential edge of stress plate | 28, 28' |
| Plastic coating on stress plate | 29, 29' |

Third and Fourth Embodiments

| | |
|---|---|
| Square and rectangular stress plate, generally designated | 30, 30' |
| Fastener, generally designated | 32, 32' |
| Opening in center portion of stress plate | 34, 34' |
| First flat surface | 36, 36' |
| Head portion of fastener | 38, 38' |
| Second flat surface | 40, 40' |
| Third flat surface | 42, 42' |
| First parametrical portion | 44, 44' |
| Second parametrical portion | 46, 46' |
| Parametrical edge of stress plate | 48, 48' |
| Plastic coating on stress plate | 49, 49' |

Using the Stress Plate

| | |
|---|---|
| Lower thermoplastic membrane | 50 |
| Insulation | 52 |
| Roof deck | 54 |
| Fastener (screw) | 56 |
| Stress plate | 58 |
| Upper thermoplastic membrane | 60 |
| Welded seam | 62 |

Having described the invention with reference to its preferred embodiments, it is to be understood that modifications within the scope of the invention will be apparent to those skilled in the art.

What is claimed is:

1. A two-piece fastener assembly for securing two thermoplastic roof membranes to an underlying roof deck comprising:
    a) a metal stress plate of circular configuration defined by a top surface having an opening in its center portion for receiving a fastener therethrough;
    b) a thermoplastic coating covering and integral with the top surface of said metal stress plate; and
    c) a fastener positioned in said opening of said metal stress plate, wherein said metal stress plate comprises a first, second and third flat surface;
    d) a first circumferential portion, defined by a height forming a ridge or protuberance, extending above said second flat surface and towards said third flat surface at an angle of from about 25° to about 70°, connecting said second flat surface with said third flat surface; and
    e) a second circumferential portion, defined by a height forming a ridge or protuberance, extending above said first flat surface and towards said third flat surface at an angle of from about 25° to about 70°, connecting said first flat surface with said third flat surface;
    wherein the entire top surface of the metal surface plate, including the first, second and third flat surfaces, and the first and second circumferential portions, are covered by and integral with the thermoplastic coating.

2. The two-piece fastener assembly of claim 1 wherein said metal stress plate is formed of stainless steel or galvanized metals.

3. The two-piece fastener assembly of claim 1 wherein said thermoplastic coating is a material selected from a group consisting of polyvinyl chloride, thermoplastic olefins, chlorinated polyethylene, chlorosulfonated polyethylene, nylon and ethylene propylene diene rubber.

4. The two-piece fastener assembly of claim 1 wherein said fastener is a screw member having threads thereon.

5. A two-piece fastener assembly for securing two thermoplastic roof membranes to an underlying roof deck, said fastener assembly consisting of a stress plate and a fastener, wherein said stress plate consists of two integral layers, one being a metal layer and the other being a thermoplastic layer pre-fabricated prior to forming said stress plate, said stress plate comprising:
    1) a circular body of dimensions of from about 1" to about 4" diameter;
    2) an opening in its center portion of about 0.25" diameter;
    3) a first flat surface surrounding said opening having a width of about 0.25";
    4) a second flat surface adjacent to a circumferential edge of said stress plate having a width of from about 0.12" to about 0.25";
    5) a third flat surface extending between said first flat surface and said second flat surface having a width of from about 0.25" to about 1.0", connecting the second flat with the third flat surface, a first circumferential portion in the form of a ridge or protuberance extends above the second flat surface and towards the third flat surface at an angle of from abut 25° to about 70°; connecting the first flat surface with the third flat surface, a second circumferential portion in the form of a ridge or protuberance extends above the first flat surface and towards the third flat surface at an angle of from abut 25° to about 70°,
    the distance between said first flat surface and said third flat surface is from about 0.026" to about 0.100", and the total height of said stress plate is of from about 0.026" to about 0.100";
    wherein the entire top surface of the metal surface plate, including the first, second and third flat surfaces, and the first and second circumferential portions, are covered by and integral with the thermoplastic coating.

6. The two-piece fastener assembly of claim 5 wherein said metal stress plate is formed of stainless steel or galvanized metals.

7. The two-piece fastener assembly of claim 5 wherein said thermoplastic coating is a material selected from a group consisting of polyvinyl chloride, thermoplastic olefins, chlorinated polyethylene, chlorosulfonated polyethylene, nylon and ethylene propylene diene rubber.

8. The two-piece fastener assembly of claim 5 wherein said fastener is a screw member having threads thereon.

* * * * *